(12) United States Patent
Gong

(10) Patent No.: US 8,990,165 B2
(45) Date of Patent: Mar. 24, 2015

(54) METHODS, APPARATUS AND ARTICLES OF MANUFACTURE TO ARCHIVE DATA

(75) Inventor: Yu Gong, Half Moon Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 129 days.

(21) Appl. No.: 13/704,344

(22) PCT Filed: Jul. 13, 2010

(86) PCT No.: PCT/US2010/041845
§ 371 (c)(1),
(2), (4) Date: Dec. 14, 2012

(87) PCT Pub. No.: WO2012/008951
PCT Pub. Date: Jan. 19, 2012

(65) Prior Publication Data
US 2013/0110788 A1  May 2, 2013

(51) Int. Cl.
*G06F 17/30* (2006.01)
(52) U.S. Cl.
CPC .... *G06F 17/30286* (2013.01); *G06F 17/30073* (2013.01)
USPC .......................................................... 707/667
(58) Field of Classification Search
CPC ..................... G06F 17/30286; G06F 17/30073
USPC ................... 707/765, 667, 668, 671
See application file for complete search history.

(56) References Cited

U.S. PATENT DOCUMENTS

| 8,458,117 B2 * | 6/2013 | Wang et al. ............ 706/58 |
| 2005/0278357 A1 * | 12/2005 | Brown et al. .......... 707/100 |
| 2007/0226237 A1 * | 9/2007 | Gong et al. ............ 707/101 |
| 2008/0250041 A1 | 10/2008 | Dittrich et al. |
| 2009/0198729 A1 | 8/2009 | Gong |
| 2009/0287721 A1 * | 11/2009 | Golab et al. ........... 707/100 |

OTHER PUBLICATIONS

Kwok-Wa Lam et al., Building Decision Trees Using Functional Dependencies, 2004, IEEE, 4 pages.*
David W. Embley et al., Relational Database Reverse Engineering: A Model-Centric, Transformational, Interactive Approach Formalized in Model Theory, IEEE Xplore, 2009, 6 pages.
PCT International Search Report, cited in PCT/US2010/041845; April 28, 2011, 3 pages.
Wenfei Fan et al., Discovering Conditional Functional Dependencies, IEEE International Conference on Data Engineering, 2009, 4 pages.
Yka Huhtala et al., Tane: An Efficient Algorithm for Discovering Functional and Approximate Dependencies, The Computer Journal, vol. 42, No. 2, 1999, 12 pages, Department of Computer Science, Helsinki, Finland.

* cited by examiner

*Primary Examiner* — Jean B Fleurantin
(74) *Attorney, Agent, or Firm* — Hewlett-Packard Patent Department

(57) ABSTRACT

Methods, apparatus and articles of manufacture to archive data are disclosed. An example method to archive data disclosed herein comprises determining an initial data model representing functional dependencies among attributes of the data, the initial data model having fully interdependent functional dependencies among all attributes of the data, pruning one or more functional dependencies from the initial data model to determine a verified data model, and archiving a transaction included in the data to memory according to the verified data model.

13 Claims, 9 Drawing Sheets

METHODS, APPARATUS AND ARTICLES OF MANUFACTURE TO ARCHIVE DATA

BACKGROUND

Databases storing millions of data entries are commonplace. To improve database performance, database archiving techniques are used to reduce the size of an active database, also referred to herein as a production database. Unlike a backup procedure that copies the entire contents of a database to another storage location, database archiving involves moving one or more portions (e.g., such as less-used portions) of the database to an archive, also referred to herein as an archive database. Furthermore, in many database applications, an archived portion of the database needs to be complete such that the archived portion is not functionally dependent on data remaining in the active database, and vice versa. For example, when the archived portion of the database corresponds to a business transaction, the archived portion should include all functionally interdependent entries making up the archived business transaction to enable the archived business transaction to be recovered later from the archive. If the archived business transaction remains functionally dependent on data remaining in the active database, that remaining data may later be deleted or lost, making the archived business transaction unrecoverable. Conversely, if the active database remains functionally dependent on data in the data archive, the active database may become corrupted or otherwise function improperly when the archived portion is removed from the active database, which can be manifested in the form of "data not found" or similar errors. Accordingly, many database archiving techniques employ data modeling to model the functional dependencies in a database.

SUMMARY

Methods, apparatus and articles of manufacture to archive data are disclosed. A method to archive data disclosed herein comprises determining an initial data model representing functional dependencies among attributes of the data, the initial data model having fully interdependent functional dependencies among all attributes of the data, pruning one or more functional dependencies from the initial data model to determine a verified data model, and archiving a transaction included in the data to memory according to the verified data model.

DETAILED DESCRIPTION

Figure 1:
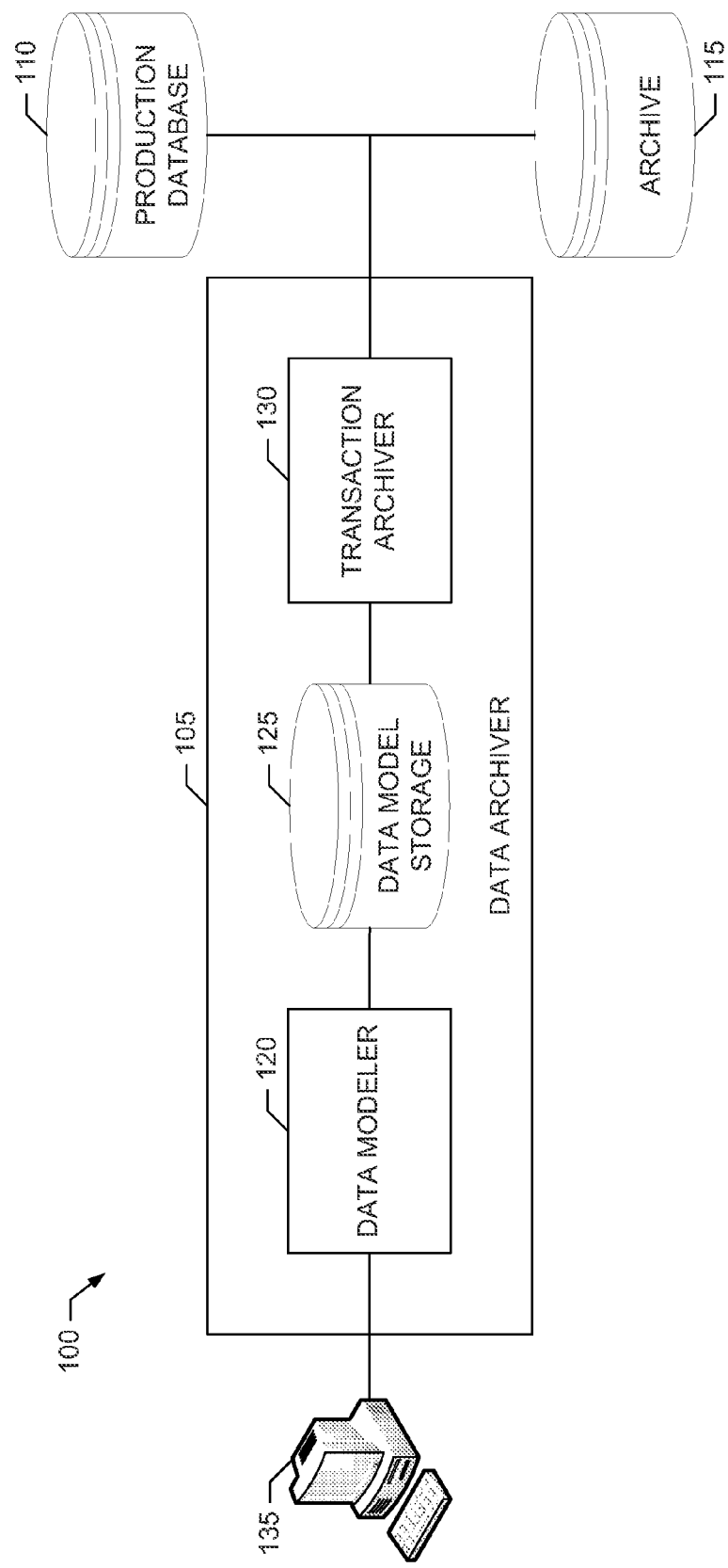
FIG. 1 is block diagram of an example environment of use for an example data archiver to archive data according to a functional dependency data model as described herein.

Methods, apparatus and articles of manufacture to archive data are disclosed herein. Although the following discloses example methods and apparatus including, among other components, software executed on hardware, it should be noted that such methods and apparatus are merely illustrative and should not be considered as limiting. For example, it is contemplated that any or all of these hardware and software components could be implemented exclusively in hardware, exclusively in software, exclusively in firmware, or in any combination of hardware, software, and/or firmware. Accordingly, while the following describes example methods and apparatus, it will readily be appreciated that the examples provided are not the only way to implement such methods and apparatus. Furthermore, wherever possible, the same reference numbers will be used throughout the drawing(s) and accompanying written description to refer to the same or like parts, objects, features, functions, etc.

An example data archiving technique disclosed herein involves determining an initial data model representing functional dependencies among attributes of the data. The initial data model is assumed to have fully interdependent functional dependencies among all attributes of the data. Two attributes are functionally dependent when the values of the first attribute are, for example, dependent on, derivable from, determinable from, etc., the values of the second attribute. A functional dependency in the data model indicates that a first set of attributes of a first data set depends upon a second set of attributes of the first data set or a second data set. The first set of attributes is referred to herein as a dependent attribute set and can include, for example, one or more attributes associated with one or more columns of a first table in a database. The second set of attributes is referred to herein as a parent attribute set and can include, for example, one or more other attributes associated with one or more other columns of the first table or a second table in the database. Consistent with database vernacular, each parent attribute set is considered to make up a respective key specifying attribute values that can be used to uniquely describe the data entries in a database.

Additionally, the example disclosed data archiving technique involves pruning one or more functional dependencies from the initial data model to determine a verified data model. As noted above, the initial data model is assumed to have fully interdependent functional dependencies among all attributes of the data or, in other words, the initial data model assumes the attributes (e.g., columns) of the data (e.g., databases) are fully, or all-to-all, interdependent. In some examples, the disclosed data archiving prunes, or removes, functional dependencies by determining a set of candidate keys comprising respective parent attribute sets, and for each candidate key either pruning the particular candidate key from the set of candidate keys when samples of the data indicate the particular candidate key cannot be an actual key, or increasing a confidence value associated with the particular candidate key when the data samples indicate that the particular candidate key is likely an actual key. Additionally or alternatively, the disclosed data archiving prunes, or removes, functional dependencies by determining a set of functional dependencies for a set of candidate keys, and for each functional dependency either increasing a confidence value associated with the particular functional dependency when samples of the data indicate that the particular dependent attribute set corresponding to the particular functional dependency does depend upon an associated candidate key, or decreasing the confidence value associated with the particular functional dependency when the data samples indicate that the particular dependent attribute set corresponding to the particular functional dependency does not depend upon the associated candidate key. In some examples, after completion of a number of processing iterations, the verified data model is determined by pruning candidate keys (and associated functional dependencies) having confidence values lower than a threshold. Additionally or alternatively, individual functional dependencies having confidence values lower than the same or a different threshold can be pruned to determine the verified data model.

Furthermore, the example disclosed data archiving technique involves archiving a transaction included in the data to memory according to the verified data model. A transaction typically includes multiple data entries (e.g., database rows) across one or more data sets (e.g., one or more database tables), where each entry has one or more attributes (e.g., one or more database columns). In some examples, the verified data model can be used to ensure that all functionally dependent data entries making up the transaction are included in the archive (e.g., which would make the archived transaction complete and recoverable). Additionally, the verified data model can be used to ensure that the archive does not include any data entries upon which data entries in the actual (e.g., production) database are still functionally dependent (e.g., which avoids causing the actual database to become corrupted or otherwise function improperly).

The example disclosed data archiving technique also involves processing a user interface that accepts one or more commands input by a user. An example set of commands that can be accepted via the user interface include, but are not limited to: (1) a first command to force removal of a specified candidate key from the data model, (2) a second command to force inclusion of the specified candidate key in the data model and to cause a confidence value associated with the specified candidate key to be set to a maximum value (e.g., such as 100%), (3) a third command to force removal of a specified functional dependency from the data model, and (4) a fourth command to force inclusion of the specified functional dependency in the data model and to cause a confidence value associated with the specified functional dependency to be set to the maximum value (e.g., such as 100%).

Prior data archiving techniques that employ data modeling typically begin with the assumption that there are no functional dependencies in the data. These prior techniques then use various approaches to discover functional dependencies in the data. Such discovery techniques may take considerable time to discover all the functional dependencies and, if processing is terminated early, some functional dependencies may not be discovered. Additionally, some functional dependencies may not be discovered even if the prior discovery techniques are performed to completion. However, missing just one functional dependency can cause the resulting archived data to be unrecoverable, or may render the remaining unarchived data corrupt or incomplete.

Unlike such prior techniques, the example disclosed methods, apparatus and articles of manufacture to archive data employ functional dependency modeling that initially assumes that the data is characterized by fully interdependent functional dependencies. In other words, all attributes (e.g., columns) of the data (e.g., database) are initially assumed to be all-to-all functional dependent. Then, in some examples, each candidate key of each assumed functional dependency, as well as each assumed functional dependency itself, is verified against samples of the data and removed from the data model if the data suggests the functional dependency is not actually present in the data. The remaining, verified candidate keys and associated functional dependencies form the verified data model. By beginning with the assumption that the data has fully interdependent functional dependencies, and then not removing an assumed dependency unless that data itself indicates the assumed dependency is not valid, the resulting verified data model tends to ensure that all actual functional dependencies are included in the model. By ensuring that the verified data model includes all actual functional dependencies, even if additional assumed functional dependencies that are not actual dependencies are included, the verified data model can be used by the example disclosed methods, apparatus and articles of manufacture to perform data archiving in which the resulting archived data (e.g., such as the archived transaction) can be guaranteed to be complete and recoverable, and the remaining unarchived data (e.g., such as the active database) can also be guaranteed to be complete and not corrupt (e.g., assuming proper user configuration, such as proper setting of one or more of the thresholds described below, and proper user input during operation).

Furthermore, it is unlikely that many, if not all, prior data archiving techniques are able to discover all functional dependencies and still complete in a practical amount of time. This is because the problem of discovering functional dependencies from actual data (in contrast to functional dependency verification as performed by the example disclosed methods, apparatus and articles of manufacture) is known to be a computationally complex problem. In contrast, the example disclosed data modeling techniques based on functional dependency verification (instead of discovery) can be stopped at any time during execution and still provide a useable data model that can guarantee data integrity (e.g., through setting of appropriate thresholds, through input of appropriate user commands, etc., as described in greater detail below).

Turning to the figures, a block diagram of an example environment of use 100 for an example data archiver 105 to archive data according to a functional dependency data model as described herein is illustrated in FIG. 1. The environment 100 includes an example production database 110 that represents an active database used to, for example, organize and store data into one or more data sets, with each data set containing data entries (also referred to as data instances, data tuples, data records, etc.) having one or more attributes (e.g., also referred to as characteristics, properties, etc.). In some examples, the production database 110 implements a relational database in which each data set is organized as a table having a column for each attribute and a row for each data entry. Such an example tabular relationship 200 that may be implemented by the production database 110 is illustrated in FIG. 2.

Figure 2:
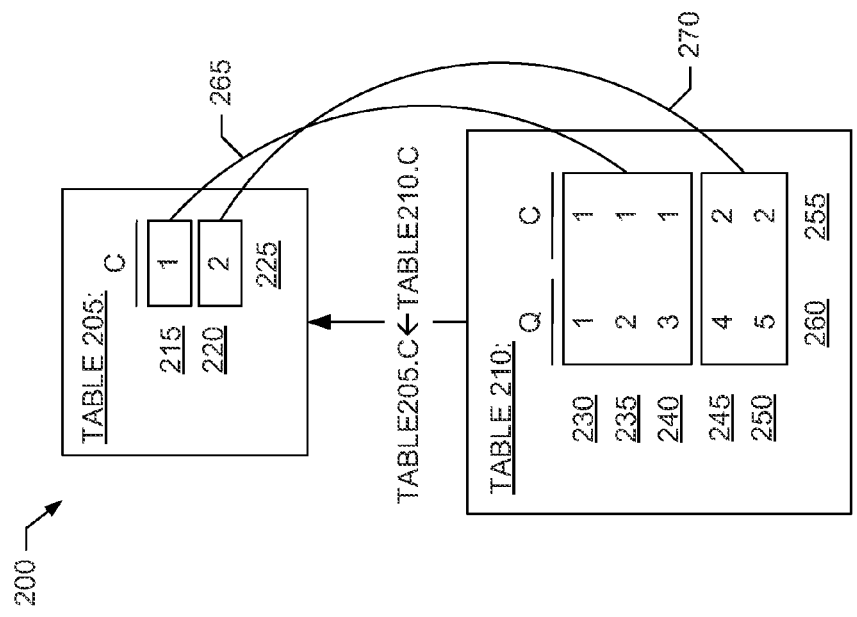
FIG. 2 illustrates an example functional dependency between tables of a database.

Turning to FIG. 2, the example tabular relationship 200 stores two data sets in two respective tables, table 205 and table 210. In the illustrated example, table 205 stores two data entries in two respective rows 215 and 220 of the table 205. The data entries in table 205 have a single attribute, 'C,' which is represented by a single column 225 of the table 205. For example, the data entry corresponding to row 215 has a value of '1' in column 225 for attribute 'C,' whereas the data entry corresponding to row 220 has a value of '2' in column 225 for attribute 'C.' In comparison, table 210 stores five data entries in five respective rows, 230, 235, 240, 245 and 250 of the table 210. The data entries in table 210 have two attributes, 'C' and 'Q,' which are represented by two respective columns 255 and 260 of the table 210. For example, the data entry corresponding to row 230 has a value of '1' in column 255 for attribute 'C' and a value of '1' in column 260 for attribute 'Q,' the data entry corresponding to row 235 has a value of '1' in column 255 for attribute 'C' and a value of '2' in column 260 for attribute 'Q,' the data entry corresponding to row 240 has a value of '1' in column 255 for attribute 'C' and a value of '3' in column 260 for attribute 'Q,' the data entry corresponding to row 245 has a value of '2' in column 255 for attribute 'C' and a value of '4' in column 260 for attribute 'Q,' and the data entry corresponding to row 250 has a value of '2' in column 255 for attribute 'C' and a value of '5' in column 260 for attribute 'Q.'

In general, an attribute provides meaning to a data value of a data entry. For example, at first glance the values stored in tables 205 and 210 may appear to be just sets of meaningless numbers. However, these values can become meaningful with knowledge of the meaning of the attributes 'C' and 'Q' represented by columns 225, 255 and 260. For example, if 'C' corresponds to customer number, and 'Q' corresponds to purchase quantity, then it becomes more apparent that table 205 stores the customer numbers for two different customers, and table 210 stores quantities of items purchased by the customers whose customer numbers are stored in table 205. Furthermore, data attributes can be used to group data entries into transactions (e.g., also referred to as business transactions, database transactions, etc.) that share one or more common attributes. For example, if 'C' corresponds to customer number, and 'Q' corresponds to purchase quantity in tables 205 and 210, then the data entries corresponding to row 215 of table 1 and rows 230-240 of table 210 can be grouped into a first transaction 265 associated with the customer having a customer number of '1' for the attribute 'C' of columns 225 and 255. Similarly, the data entries corresponding to row 220 of table 205 and rows 245-250 of table 210 can be grouped into a second transaction 270 associated with the customer having a customer number of '2' for the attribute 'C' of columns 225 and 255.

Returning to FIG. 1, the data archiver 105 is to archive data from the production database 110 into an example archive 115, such as an archive database 115. The archive 115 can be separate from, co-located with, or implemented as a portion of the production database 110, or any combination thereof. The production database 110 and the archive database 115 can be implemented using any types or combinations of storage and/or memory elements, such as the example volatile memory 1018 and/or the mass storage device 1030 of the example processing system 1000 of FIG. 10, which is discussed in greater detail below.

In the illustrated example, the data archiver 105 archives transactions stored in the production database 110 to the archive 115. As described above, a database transaction is made up of a group of data entries (e.g., database rows) sharing one or more common attributes (e.g., database columns). The data attributes provide meaning to the data entries. Furthermore, the collection of data attributes of the data stored in the production database 110 and the functional dependencies among the collection of attributes form a data model describing the data entries, their functional dependencies and, therefore, how the data entries are groupable to form complete transactions.

For example, with reference to FIG. 2, an example data model indicates that the data entries of table 205 are characterized by the single attribute 'C' represented by the column 225 and the data entries of table 210 are characterized by the two attributes 'C' and 'Q' represented by the two column 255 and 260. Additionally, the data model indicates that table 210 functionally depends on table 205 and, in particular, that column 255 of table 210 (representing the attribute 'C') functionally depends on column 225 of table 205 (also representing the attribute 'C'). Such a functional dependency can be written as table 205.C←table 210.C to indicate that attribute 'C' represented by column 225 in table 205 is a parent attribute (or parent column) specifying the unique values that this attribute (or column) can have, and that attribute 'C' represented by column 255 in table 210 is a dependent attribute (or dependent column) containing one or more data entries having respective values of this attribute (or column) as specified by the attribute 'C' represented by column 225 of table 205.

More generally, in a parent attribute and dependent attribute combination, the data set (e.g., table) associated with the parent attribute includes data entries specifying unique, permissible values that this attribute can have, whereas the data set (e.g., table) associated with the dependent attribute includes data entries having values for the dependent attribute that belong to the set of unique, permissible values specified by the parent attribute. Accordingly, the data entries in the data set (e.g., table) specifying the parent attribute are such that each data entry in the data set (e.g., table) has a unique (e.g., different) value of the attribute. For example, the attribute 'C' of column 225 in table 205 of FIG. 2 could be a parent attribute because each data entry in table 205 has a unique value for this attribute. A parent attribute also defines a set of attribute values that can be used to identify transactions containing this attribute. For example, the first transaction 265 corresponding to row 215 of table 1 and rows 230-240 of table 210 have a unique value ('1') for the attribute 'C,' and the second transaction 270 corresponding to row 220 of table 1 and rows 245-250 of table 210 have a unique value ('2') for the attribute 'C.' In some examples, attributes that are not unique themselves can be combined to form a parent set of attributes specifying a combination of attribute values that are unique and can be used to uniquely associate data entries belonging to a particular transaction. For example, if a database includes a table of data containing a 'name' attribute (e.g., column) specifying a customer's name and an 'address' attribute (e.g., column) specifying a customer's address, each of these attributes by itself may not be unique because different customers may have the same name and different customers may reside at the same address. However, taken together, the set of attributes containing the 'name' and 'address' attributes can form a parent attribute set for which each data entry in the table has a unique value. In database vernacular, a parent attribute or parent set of attributes is referred to as a 'key' that uniquely describes the data. Also, as used herein, a set of attributes can include none, one or more attributes.

Relative to a particular parent attribute or parent set of attributes, a dependent attribute or dependent set of attributes does not specify the unique values of this attribute or set of attributes. Instead, the dependent attribute or dependent set of attributes takes on permissible values as specified by its associated parent attribute or parent set of attributes. For example, the attribute 'C' of column 255 in table 210 of FIG. 2 is not a parent attribute because each data entry in table 210 does not have a unique value for this attribute. However, the attribute 'C' of column 255 in table 210 could be a dependent attribute of the parent attribute 'C' of column 225 in table 205 because the attribute 'C' of column 255 takes on values as specified by the parent attribute 'C.'

Although functionally dependent attributes (e.g., such as a parent attribute and its associated dependent attribute) often have the same name, the data model may specify functionally dependent attributes having different names. For example, a data model could specify that 'customer number' is a parent attribute specified by one table, and 'customer identifier' is a dependent attribute in a second table, where the 'customer identifier' attribute is to take on values of the 'customer number' attribute. Also, as used herein, the terms "attribute" and "column" are interchangeable, the terms "data entry" and "row" are interchangeable, and the terms "data set" and "table" are interchangeable, unless noted otherwise.

Returning to FIG. 1, to enable determination of the groups of data entries forming complete transactions in the production database, the data archiver 105 includes an example data modeler 120. The data modeler 120 operates to determine the data model describing the functional dependencies between the attributes of the data stored in the production database 110 from the data entries and attributes stored therein. In other words, the data modeler 120 uses data entries and attributes stored in the production database 110 to determine or reverse engineer the data model describing the functional dependencies between attributes and, thus, between data entries. The data model determined by the data modeler 120 is stored in an example data model storage 125, which can be implemented using any types or combinations of storage and/or memory elements, such as the example volatile memory 1018 and/or the mass storage device 1030 of the example processing system 1000 of FIG. 10, which is discussed in greater detail below.

An example transaction archiver 130 included in the data archiver 105 uses the data model stored in the data model storage 125 to archive data (e.g., transactions) from the production database 110 to the archive 115 according to the determined (e.g., reverse engineered) data model. In particular, the transaction archiver 130 uses the functional dependencies specified by the determined data model to identify related data entries belonging to a transaction to be archived. For example, a particular transaction to be archived may be specified (e.g., via an example terminal 135 described in greater detail below) using a value of a parent attribute or values of a parent set of attributes. The transaction archiver 130 then examines the functional dependencies between attributes as specified by the data model and, using any appropriate functional dependency-based archiving technique, traverses the dependencies to identify data entries having attributes that functionally depend on the parent attribute value(s) identifying the transaction to be archived. The transaction archiver 130 can also examine other attributes of the identified data entries to identify respective parent attribute(s) of these other attributes. The transaction archiver 130 can then continue this process to iteratively determine all data entries that are functionally dependent on the originally specified parent attribute value(s) for the transaction to be archived. After all functionally dependent data entries are identified, the transaction archiver 130 archives the identified data entries forming specified transaction to the archive 115. For example, such archiving can involve copying the data entries (e.g., retaining their tabular relationships) to the archive 115 and then deleting these entries from the production database 110.

As noted above, in many applications, transactions (or, more generally, data portions) archived by the data archiver 105 should be complete or, in other words, contain all functionally dependent data entries, to enable the archived transaction to be recovered from the archive 115 at a later time. Additionally, to avoid corruption of other incorrect operation, the archived transaction should be accurate and not contain data entries upon which other data entries remaining in the production database 110 are functionally dependent. As such, successful (e.g., complete and accurate) data archiving depends upon determining a data model specifying all functional dependencies in the data stored in the production database 110. As noted above, prior art reverse engineering data modeling techniques typically begin with the assumption that there are no functional dependencies in the data, and then use various approaches to discover functional dependencies in the data. However, such prior data modeling techniques can take considerable time to complete and, if stopped prior to completion, can yield a data model that does not include all the functional dependencies. Unlike such prior techniques, the data modeling performed by the data modeler 120 initially assumes that the data is characterized by fully (e.g., all-to-all) interdependent functional dependencies between data attributes. Assumed functional dependencies are then removed, or pruned, by verifying the assumed functional dependency against the actual data stored in the production database. Such an approach tends to ensure that the determined data model includes all the actual functional dependencies exhibited by the data. The data model determined by the data modeler 120 may also include additional assumed functional dependencies that are not actual functional dependencies, but such over-inclusion of functional dependencies is usually of less concern than not including an actual functional dependency, which can occur with prior data modeling techniques.

Figure 3A:
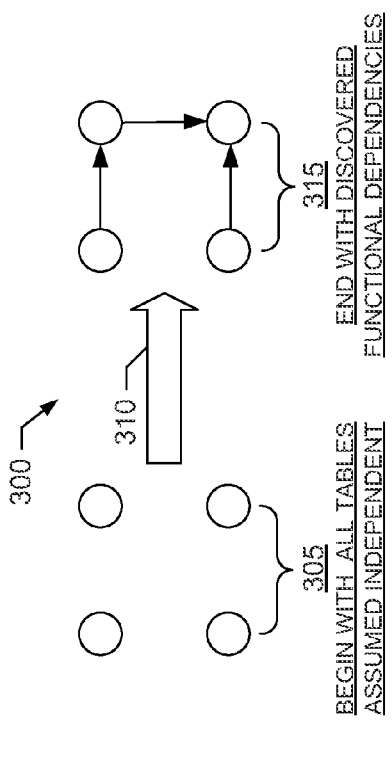
FIG. 3A illustrates example prior art functional dependency data modeling.

To further illustrate a distinction between data modeling performed by the data modeler 120 relative to prior modeling techniques, FIG. 3A illustrates an example modeling operation 300 of a prior art data modeling technique to determine a data model specifying functional dependencies between data attributes. In the example of FIG. 3A, the prior art data modeling technique is to determine a data model for a database that includes four tables (represented in the figure as a group of four circles). As described above, the modeling operation 300 of the prior art data modeling technique begins by assuming that there are no functional dependencies between the tables. In the example of FIG. 3A, this assumption of no functional dependencies is represented by a table grouping 305 in which there are no relationships depicted between tables. Then, the prior art data modeling technique is performed (represented by a directed arrow 310) to determine the functional dependencies between the data tables and, more specifically, between attributes (or columns) of the data tables. In the example of FIG. 3A, the resulting data model specifying the collection of functional dependencies is represented by a table grouping 315 in which the functional dependencies between tables are represented by directed arrows.

Figure 3B:
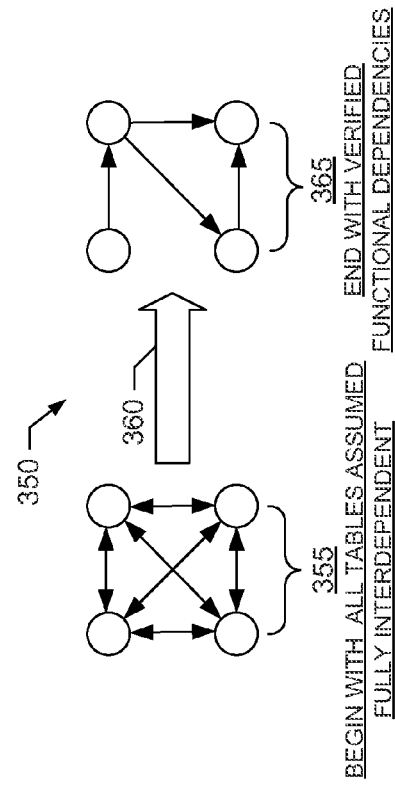
FIG. 3B illustrates example operation of the data archiver of FIG. 1 to perform functional dependency data modeling according to the methods and apparatus described herein.

In contrast to the prior art modeling technique illustrated in FIG. 3A, FIG. 3B illustrates an example modeling operation 350 of the data modeler 120 to determine a data model specifying functional dependencies between data attributes. In the example of FIG. 3B, the data modeler 120 is to determine a data model for the same database containing four tables that was the subject of the prior art modeling operation 300 of FIG. 3A. However, unlike the prior art modeling operation 300, the data modeler 120 begins the modeling operation 350 by assuming that there are fully interdependent (e.g., all-to-all) functional dependencies between the tables. In the example of FIG. 3B, this assumption of fully interdependent (e.g., all-to-all) functional dependencies is represented by a table grouping 355 in which there are functional dependencies (represented by directed arrows) in both directions between each pair of tables and, more specifically, between each pair of attributes or sets of attributes (or columns) of each pair of tables. Then, the data modeler 120 performs its data modeling procedure (represented by a directed arrow 360) to determine the functional dependencies between the data tables and, more specifically, between attributes (or columns) of the data tables. In the example of FIG. 3B, the resulting data model specifying the collection of functional dependencies is represented by a table grouping 365 in which the functional dependencies between tables are represented by directed arrows. The resulting table grouping 365 illustrates the possibility of over-inclusion of functional dependencies relative to the table grouping 315 of FIG. 3A. However, as noted above, the over-inclusion of functional dependencies is usually of less concern than not including an actual functional dependency, which can occur with the prior data modeling technique whose operation is illustrated in FIG. 3A, especially if the prior technique is terminated early. For example, because of the potentially high computational complexity for functional dependency determination in at least some example database applications, a user may wish to stop data modeling at some intermediate processing stage and still obtain a usable data model. Prior data modeling techniques based on functional dependency discovery are generally unable to provide such an early-termination feature, whereas the example disclosed data modeling techniques can support such early termination.

Returning to FIG. 1, the data archiver 105 interfaces with an example terminal 135. The example terminal 135 can be implemented using any type of terminal, computer, device, etc., capable of receiving information from and presenting information to a user. In the illustrated example, the terminal 135 enables the data modeler 120 to accept input commands from a user at various stages of its data modeling procedure. The data modeler 120 is also able to present initial, intermediate and final modeling results to the user via the terminal 135. Additionally, in some examples the terminal 135 can be used by a user to control the transaction archiver 130 by specifying one or more transactions (or, more generally, one or more portions) of the production database 110 to be archived to the archive 115.

Although the example disclosed methods, apparatus and articles of manufacture are described in the context of data archiver 105 archiving database transactions stored in the production database 110, the disclosed methods, apparatus and articles of manufacture are not limited thereto. For example, the disclosed methods, apparatus and articles of manufacture can be used to archive any type of data having attributes that exhibit functional dependencies.

Figure 4:
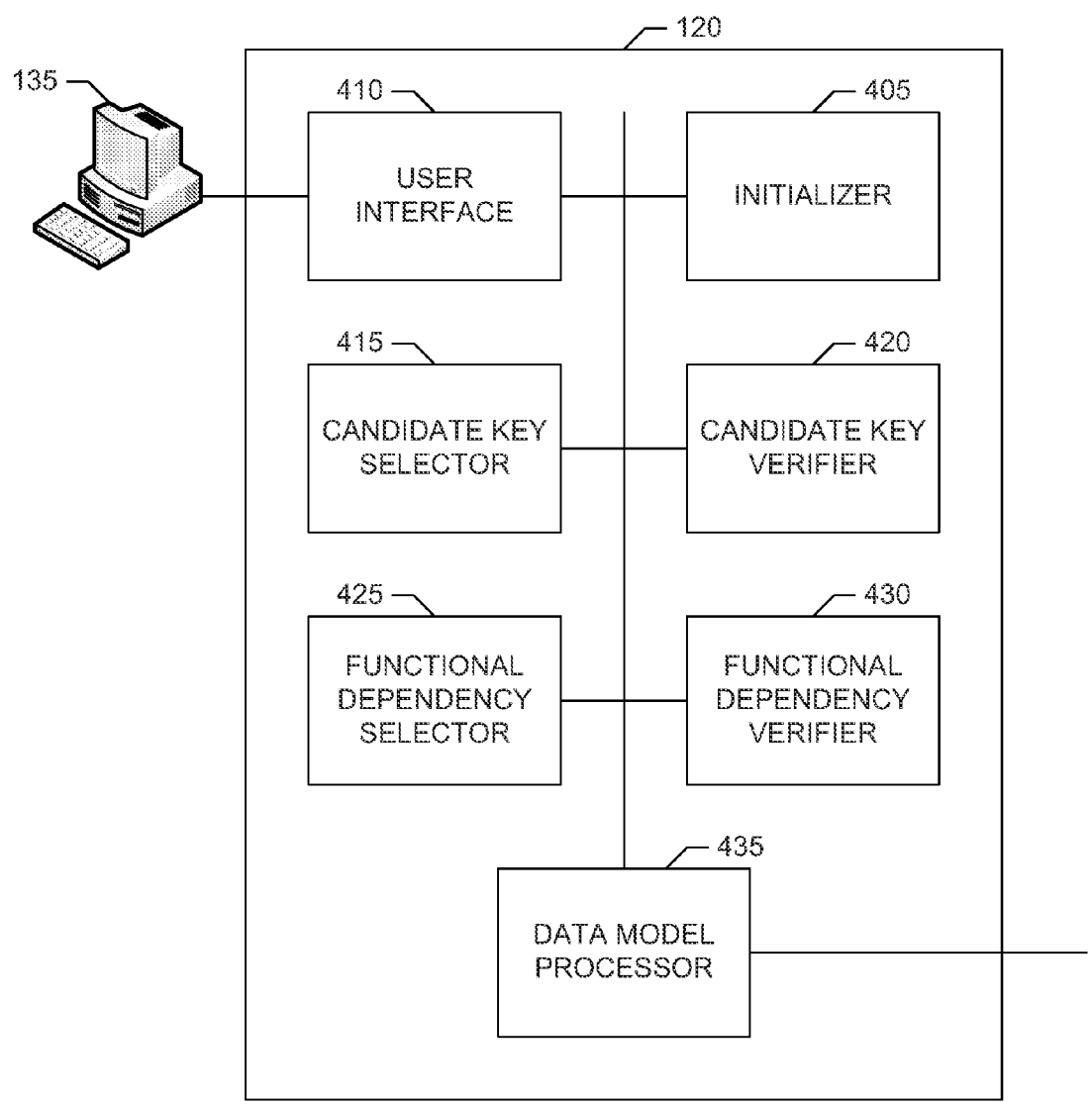
FIG. 4 is a block diagram of an example data modeler that may be used to implement the data archiver of FIG. 1.

A block diagram of an example implementation of the data modeler 120 of FIG. 1 is illustrated in FIG. 4. In the illustrated example of FIG. 4, the data modeler 120 includes an example initializer 405 to initialize the data modeling procedure performed by the data modeler 120. For example, the initializer 405 obtains the configuration data specifying the data sets (e.g., tables) and associated attributes (e.g., columns) of the tables) for the data stored in the presentation database 110. The initializer 405 then determines an initial data model in which functional dependencies are assumed to exist between all attributes of all data sets (e.g., the initial model assumes fully interdependent functional dependencies). In some examples, the configuration data is received via an example user interface 410 implemented using any appropriate interface technology for interfacing with the terminal 135. Additionally or alternatively, the configuration data can be obtained from configuration files/information used to implement the production database 110.

The data modeler 120 also includes an example candidate key selector 415 to determine a set of candidate keys for the functional dependencies included in the data model. As noted above, a key corresponds to a parent attribute or, more generally, a parent set of attributes for one or more functional dependencies between attributes, or sets of attributes. The set of keys determined by the candidate key selector 415 are referred to as candidate keys because during initial and intermediate processing, the keys are considered to be candidates that are to be verified against the data stored in the production database 110. In some examples, the candidate key selector 415 initially assumes all attributes or sets of attributes are candidate keys. Additionally, the candidate key selector 415 can obtain configuration information received from the terminal 135 via the user interface 410 to select or discard one or more attributes or attribute sets from consideration as candidate keys. Furthermore, in some examples the candidate key selector 415 associates an initial confidence level (also referred to as a confidence value) with each candidate key that represents a confidence that the candidate key is an actual key for the data stored in the production database 110.

Using the set of candidate keys selected by the candidate key selector 415, an example candidate key verifier 420 included in the data modeler 120 verifies each candidate key against the data, or at least samples of the data, stored in the production database 110. For example, the candidate key verifier 420 can determine whether a sample of data indicates that a particular candidate key violates one or more criteria for being a key. If the particular candidate key does violate one or more key criteria, the candidate key verifier 420 can remove, or prune, the particular candidate key from the set of candidate keys. However, if the data sample indicates that the particular candidate key does not violate the key criteria, then the candidate key verifier 420 can keep the particular candidate key in the set of candidate keys and also increase its associated confidence level. In some examples, the candidate key verifier 420 can iteratively compare each particular candidate key against different samples of the data, and at each iteration either prune the particular candidate key from the set or increase the particular candidate key's confidence level. Furthermore, in some examples the candidate key verifier 420 can obtain configuration information received from the terminal 135 via the user interface 410 to force one or more candidate keys to be pruned and/or force one or more other candidate keys to be accepted as actual keys (e.g., with a maximum confidence level of 100%).

The data modeler 120 further includes an example functional dependency selector 425 to determine a set of functional dependencies for each candidate key included in the current set of candidate keys. As noted above, a functional dependency is specified by a dependent attribute or dependent set of attributes (compactly referred to as a dependent attribute set) that depends upon a key made up of a parent attribute or a parent set of attributes (compactly referred to as a parent attribute set). Accordingly, for each particular candidate key included in the current set of candidate keys, the functional dependency selector 425 determines the functional dependencies for the particular candidate key by determining the dependent attribute sets for the particular candidate key. In some examples, the candidate key selector 415 initially assumes that, for a particular candidate key, all attributes or sets of attributes not included in the parent attribute set making up the candidate key are dependent attributes or dependent attribute sets of the particular candidate key (an assumption that follows from assuming fully interdependent functional dependencies in the initial data model). Additionally, the functional dependency selector 425 can obtain configuration information received from the terminal 135 via the user interface 410 to select or discard one or more attributes or attribute sets from consideration as a dependent attribute set for a particular candidate key. Furthermore, in some examples the functional dependency selector 425 associates an initial confidence level with each functional dependency that represents a confidence that the functional dependency is an actually dependent upon its associated candidate key.

Using the set of functional dependencies selected for each candidate key by the functional dependency selector 425, an example functional dependency verifier 430 included in the data modeler 120 verifies each functional dependency against the data, or at least samples of the data, stored in the production database 110. For example, the functional dependency verifier 430 can determine whether a sample of data indicates that, for a particular assumed functional dependency, the dependent attribute set does not appear to depend upon the associated candidate key (e.g., the associated parent attribute set). If the data sample indicates that the dependent attribute set does not appear to depend upon the associated candidate key, the functional dependency verifier 430 reduces the confidence level associated with that functional dependency. However, if the data sample indicates that the dependent attribute set does appear to depend upon the associated candidate key, the functional dependency verifier 430 increases the confidence level associated with that functional dependency. In some examples, the functional dependency verifier 430 can iteratively compare each particular functional dependency for each particular candidate key against different samples of the data, and at each iteration either decrease or increase the particular functional dependency's confidence level. Furthermore, in some examples the functional dependency verifier 430 can obtain configuration information received from the terminal 135 via the user interface 410 to force one or more functional dependencies to be pruned and/or force one or more other functional dependencies to be accepted as actual keys (e.g., with a maximum confidence level of 100%).

The data modeler 120 also includes an example data model processor 435 to determine a resulting verified data model from the set of candidate keys and associated confidence levels determined by the candidate key verifier 420 and the set of functional dependencies and associated confidence levels determined by the functional dependency verifier 430. For example, the data model processor 435 can determine the verified data model by pruning candidate keys (and associated functional dependencies) having confidence values lower than a threshold (e.g., specified as a configuration parameter via the terminal 135, hardcoded, etc.). Furthermore, the data model processor 435 can prune individual functional dependencies having confidence values lower than the same or a different threshold (e.g., specified as a configuration parameter via the terminal 135, hardcoded, etc.) to determine the verified data model. The data model processor 435 then stores the verified data model to the data model storage 125.

The operation and functionality of the data modeler 120 and its constituent elements are described in greater detail below in connection with the descriptions of FIGS. 5-9.

While example manners of implementing the data archiver 105 and the data modeler 120 have been illustrated in FIGS. 1 and 4, one or more of the elements, processes and/or devices illustrated in FIGS. 1 and/or 4 may be combined, divided, re-arranged, omitted, eliminated and/or implemented in any other way. Further, the example production database 110, the example archive 115, the example data model storage 125, the example transaction archiver 130, the example terminal 135, the example initializer 405, the example user interface 410, the example candidate key selector 415, the example candidate key verifier 420, the example functional dependency selector 425, the example functional dependency verifier 430, the example data model processor 435 and/or, more generally, the example data modeler 120 of FIGS. 1 and 4, and/or the example data archiver 105 of FIG. 1 may be implemented by hardware, software, firmware and/or any combination of hardware, software and/or firmware. Thus, for example, any of the example production database 110, the example archive 115, the example data model storage 125, the example transaction archiver 130, the example terminal 135, the example initializer 405, the example user interface 410, the example candidate key selector 415, the example candidate key verifier 420, the example functional dependency selector 425, the example functional dependency verifier 430, the example data model processor 435 and/or, more generally, the example data modeler 120 and/or the example data archiver 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example data archiver 105, the example production database 110, the example archive 115, the example data modeler 120, the example data model storage 125, the example transaction archiver 130, the example terminal 135, the example initializer 405, the example user interface 410, the example candidate key selector 415, the example candidate key verifier 420, the example functional dependency selector 425, the example functional dependency verifier 430 and/or the example data model processor 435 are hereby expressly defined to include a computer readable medium such as a memory, digital versatile disk (DVD), compact disk (CD), etc., storing such software and/or firmware. Further still, the example data archiver 105 of FIG. 1 and/or the example data modeler 120 of FIGS. 1 and/or 4 may include one or more elements, processes and/or devices in addition to, or instead of, those illustrated in FIGS. 1 and/or 4, and/or may include more than one of any or all of the illustrated elements, processes and devices.

Flowcharts representative of example machine readable instructions that may be executed to implement the example data archiver 105, the example production database 110, the example archive 115, the example data modeler 120, the example data model storage 125, the example transaction archiver 130, the example terminal 135, the example initializer 405, the example user interface 410, the example candidate key selector 415, the example candidate key verifier 420, the example functional dependency selector 425, the example functional dependency verifier 430 and/or the example data model processor 435 are shown in FIGS. 5-9. In these examples, the machine readable instructions represented by each flowchart may comprise one or more programs for execution by a processor, such as the processor 1012 shown in the example processing system 1000 discussed below in connection with FIG. 10. Alternatively, the entire program or programs and/or portions thereof implementing one or more of the processes represented by the flowcharts of FIGS. 5-9 could be executed by a device other than the processor 1012 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 5-9 may be implemented manually. Further, although the example machine readable instructions are described with reference to the flowcharts illustrated in FIGS. 5-9, many other techniques for implementing the example methods and apparatus described herein may alternatively be used. For example, with reference to the flowcharts illustrated in FIGS. 5-9, the order of execution of the blocks may be changed, and/or some of the blocks described may be changed, eliminated, combined and/or subdivided into multiple blocks.

As mentioned above, the example processes of FIGS. 5-9 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5-9 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered interchangeable unless indicated otherwise.

Figure 5:
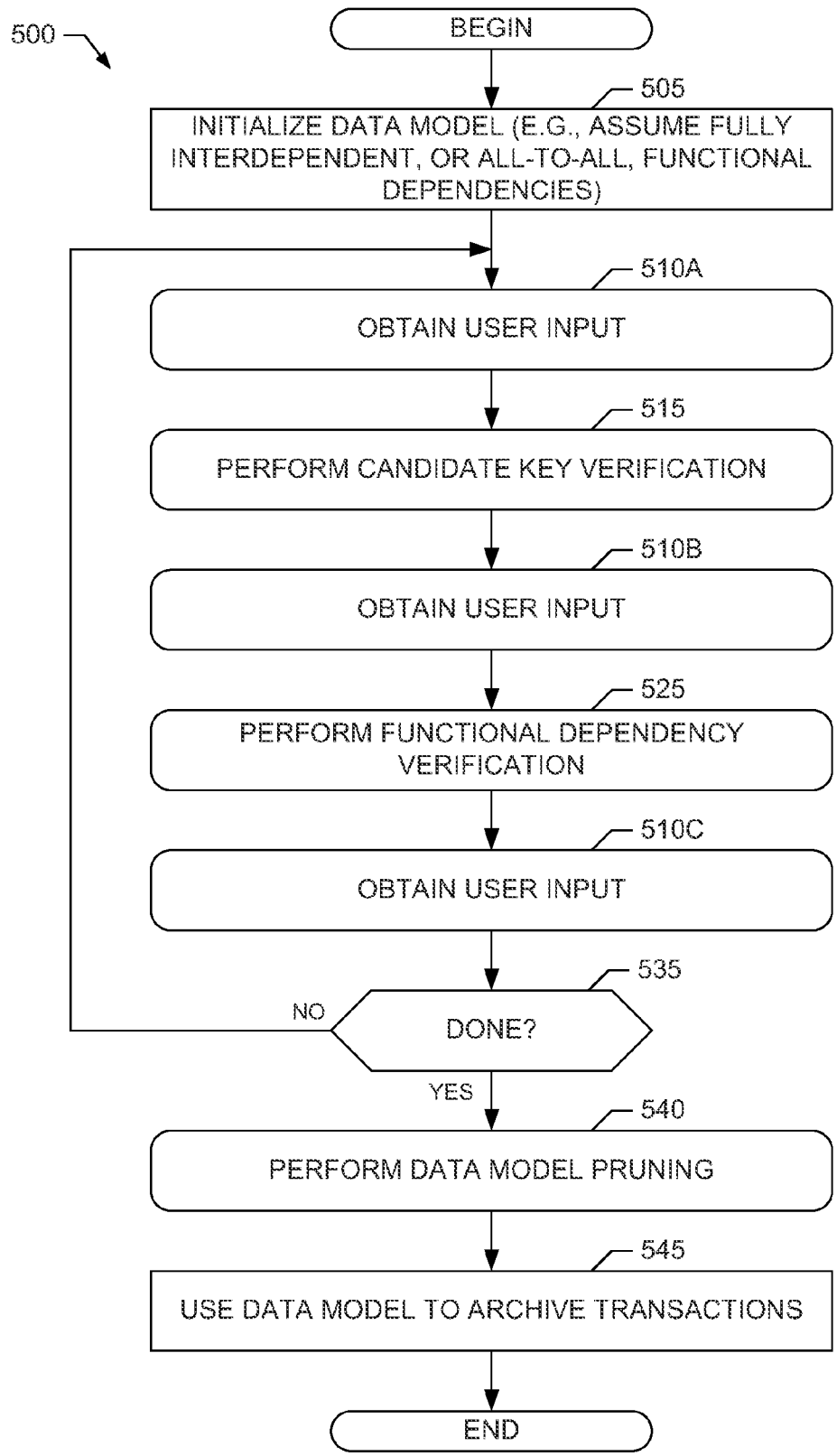
FIG. 5 is a flowchart representative of example machine readable instructions that may be executed to implement the data archiver of FIG. 1.

Example machine readable instructions 500 that may be executed to implement the data archiver 105 of FIG. 1 are represented by the flowchart shown in FIG. 5. With reference to the data archiver 105 illustrated in FIG. 1 and the data modeler 120 illustrated in FIG. 4, the machine readable instructions 500 of FIG. 5 begin execution at block 505 at which the initializer 405 included in the data modeler 120 of the data archiver 105 obtains configuration information specifying the data sets (e.g., tables) and associated attributes (e.g., columns of the tables) for the data stored in the presentation database 110. The initializer 405 then determines an initial data model in which there are fully interdependent (e.g., all-to-all) functional dependencies assumed to exist between all attributes of all data sets. Additionally, the initializer 405 can obtain configuration information to configure one or more confidence thresholds used to determine whether to prune candidate keys and/or functional dependencies from the initial data model to determine a verified data model. The configuration information may be obtained via one or more input commands entered by a user of the user terminal 135, by accessing configuration data stored in the production database 110, etc., or any combination thereof.

Figure 6:
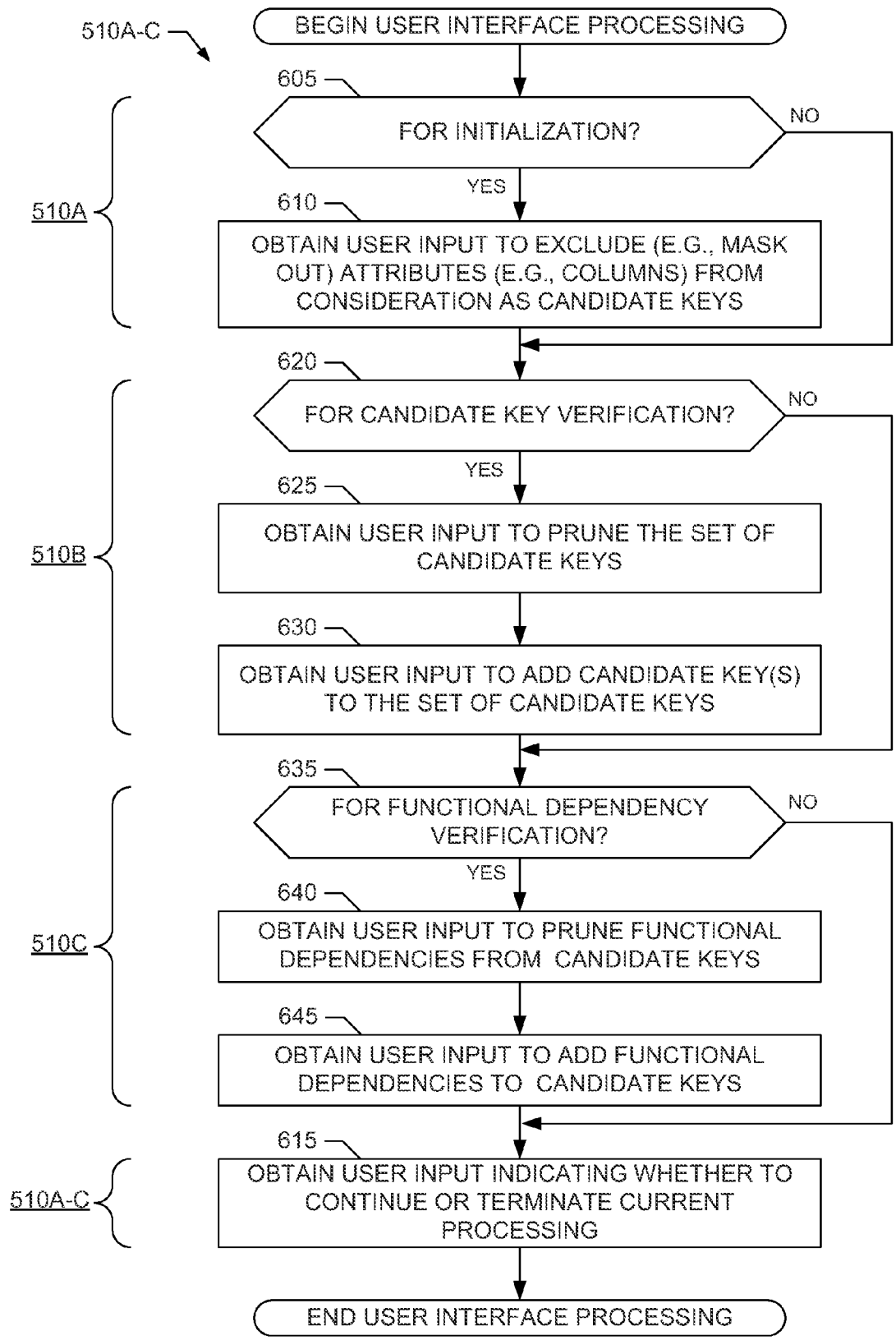
FIG. 6 is a flowchart representative of example machine readable instructions that may be executed to implement user interface processing in the data modeler of FIG. 4 and/or the data archiver of FIG. 1.

At block 510A, the data modeler 120 obtains user input to exclude (e.g., mask out) attributes (e.g., table columns) from being considered as candidate keys prior to beginning model verification. An example procedure that may be used to implement the processing at block 510A is illustrated in FIG. 6 and described in greater detail below.

Figure 7:
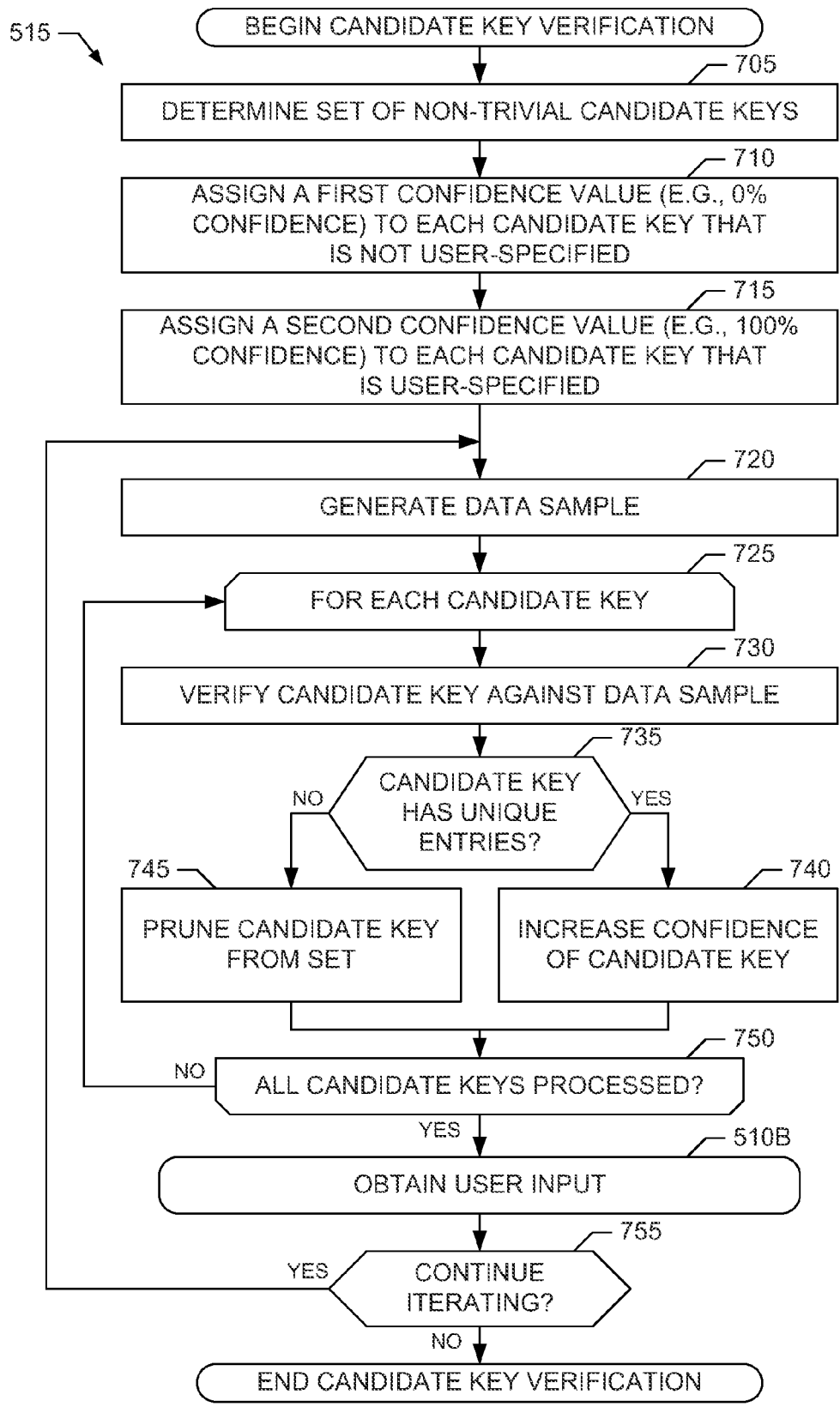
FIG. 7 is a flowchart representative of example machine readable instructions that may be executed to implement candidate key verification in the data modeler of FIG. 4 and/or the data archiver of FIG. 1.

At block 515, the data modeler 120 determines a set of candidate keys (e.g., excluding those attributes masked-out at block 510) for the functional dependencies included in the data model and performs candidate key verification to prune candidate keys from the data model. For example, the data modeler 120 uses one or more samples of the data stored in the production database 110 to verify whether each candidate key satisfies the criteria for being a key. An example procedure that may be used to implement the processing at block 515 is illustrated in FIG. 7 and described in greater detail below.

At block 510B, the data modeler 120 obtains user input to, for example, force pruning of one or more candidate keys still remaining after processing at block 515. Additionally or alternatively, at block 510B the data modeler 120 obtains user input to, for example, force inclusion of one or more candidate keys in the data model (e.g., to force the one or more candidate keys to be considered to be actual keys with maximum (e.g., 100%) confidence). Further discussion of the processing performed at block 510B is provided below in connection with the description of FIG. 6.

Figure 8:
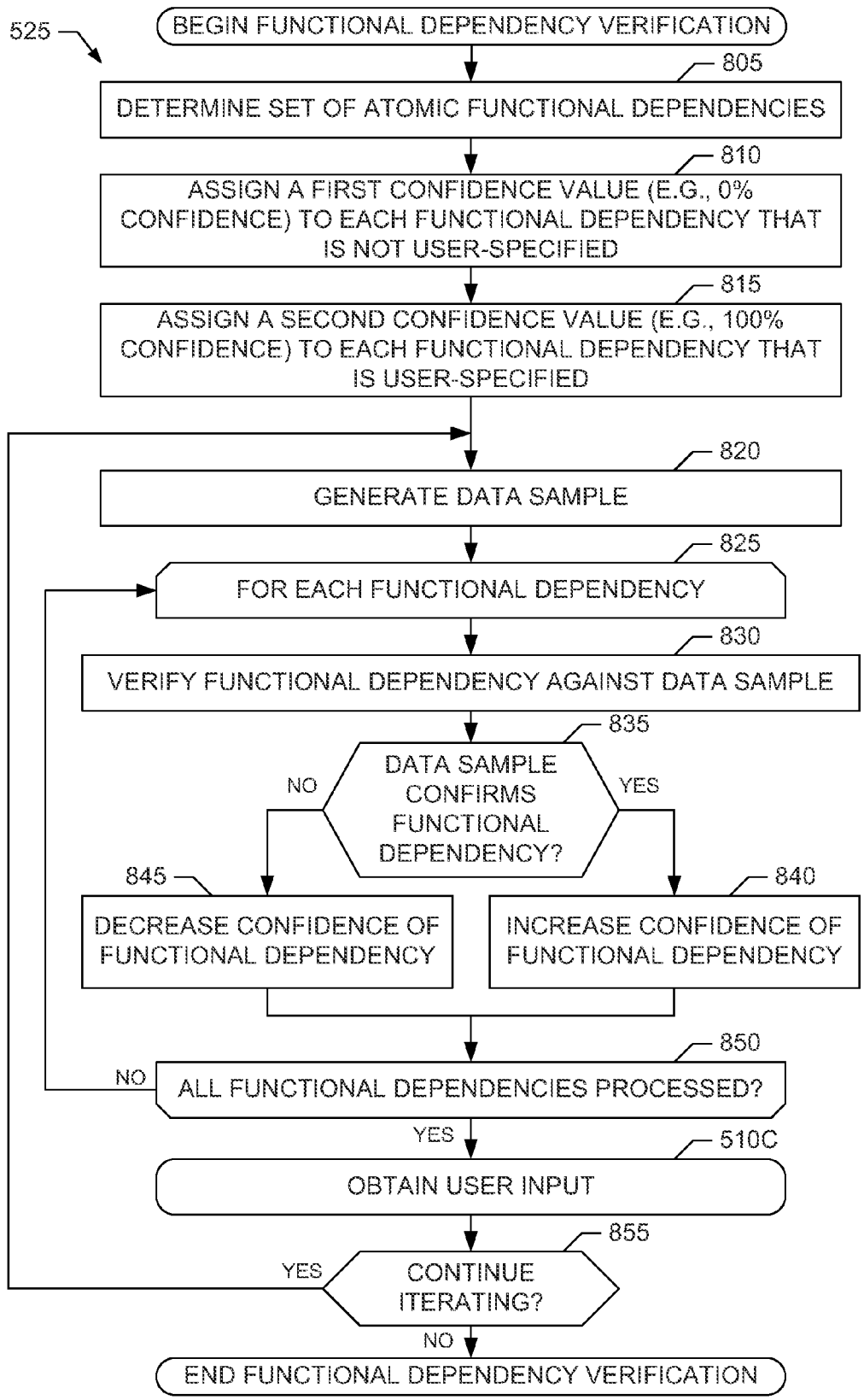
FIG. 8 is a flowchart representative of example machine readable instructions that may be executed to implement functional dependency verification in the data modeler of FIG. 4 and/or the data archiver of FIG. 1.

At block 525, the data modeler 120 determines a set of functional dependencies for each candidate key remaining in the set of candidate keys after processing at blocks 515 and 520. At block 525 the data modeler 120 also performs functional dependency verification to prune functional dependencies from each remaining candidate key in the data model. For example, the data modeler 120 uses one or more samples of the data stored in the production database 110 to verify whether a particular dependent attribute set of a particular functional dependency appears (at least based on a data sample) to depend from the particular candidate key of the particular functional dependency. An example procedure that may be used to implement the processing at block 525 is illustrated in FIG. 8 and described in greater detail below.

At block 510C, the data modeler 120 obtains user input to, for example, force pruning of one or more functional dependencies still remaining after processing at block 525. Additionally or alternatively, at block 510C the data modeler 120 obtains user input to, for example, force inclusion of one or more functional dependencies in the data model (e.g., with maximum (e.g. 100%) confidence).

Additionally, at block 510C the data modeler 120 obtains user input to, for example, determine whether data modeling is complete. For example, the data modeler 120 may present the current data model to a user (e.g., via the user interface 410 and the terminal 135) by presenting the current set of candidate keys, associated functional dependencies and associated confidence levels in a form, such as a tabular form listing candidate keys in a first column and associated functional dependencies in a second and subsequent columns, or graphically in a form similar to FIG. 3B, etc. The data modeler 120 also prompts for an input from the user indicating whether another iteration of the data modeling procedure is to be performed. Additionally or alternatively, the data modeler 120 may present a summary of the confidence associated with the current model (e.g., by presenting the lowest or highest confidence level among all candidate keys and functional dependencies, by presenting an average or mean of the confidence levels, etc.) and prompts for an input from the user indicating whether another iteration of the data modeling procedure is to be performed. Alternatively, the decision whether to proceed with another processing iteration may be automatic based on the data modeler 120 evaluating the confidence levels of the candidate keys and functional dependencies and comparing them to one or more thresholds. Further discussion of the processing performed at block 510C is provided below in connection with the description of FIG. 6.

Also, although the processing at each of blocks 510A, 510B and 510AC is depicted as being performed in the context of (e.g., and synchronously with) the other data archiving processing illustrated by the flowchart of FIG. 5, in some examples the processing at any, some or all of blocks 510A-C can be performed outside the context of (e.g., asynchronously relative to) the other data archiving processing. For example, in an asynchronous example, the processing at any, some or all of blocks 510A-C can be performed to obtain user input at any time (asynchronously) relative to other data archiving processing. The obtained user input can then be buffered or otherwise stored for later use when appropriate in the data archiving process. Additionally or alternatively, at any, some or all of blocks 510A-C, the data modeler 120 can allow the user to select one or more candidate keys and/or one or more functional dependencies for more extensive validation against larger data samples, or even all of the data stored in the production database 110.

At block 535, the data modeler 120 determines whether another data modeling processing iteration is to be performed. For example, the decision to perform another iteration may be based on a user input. For example, a user may examine the current model and determine that another processing iteration should be performed when the data model's confidence levels have not yet converged to steady-state levels and/or do not exceed some specified or preconfigured threshold or thresholds. Alternatively, the decision to perform another iteration may be performed automatically by the data modeler 120 based on, for example, evaluating whether the data model's confidence levels have converged to steady-state and/or exceed some specified or preconfigured threshold or thresholds.

Figure 9:
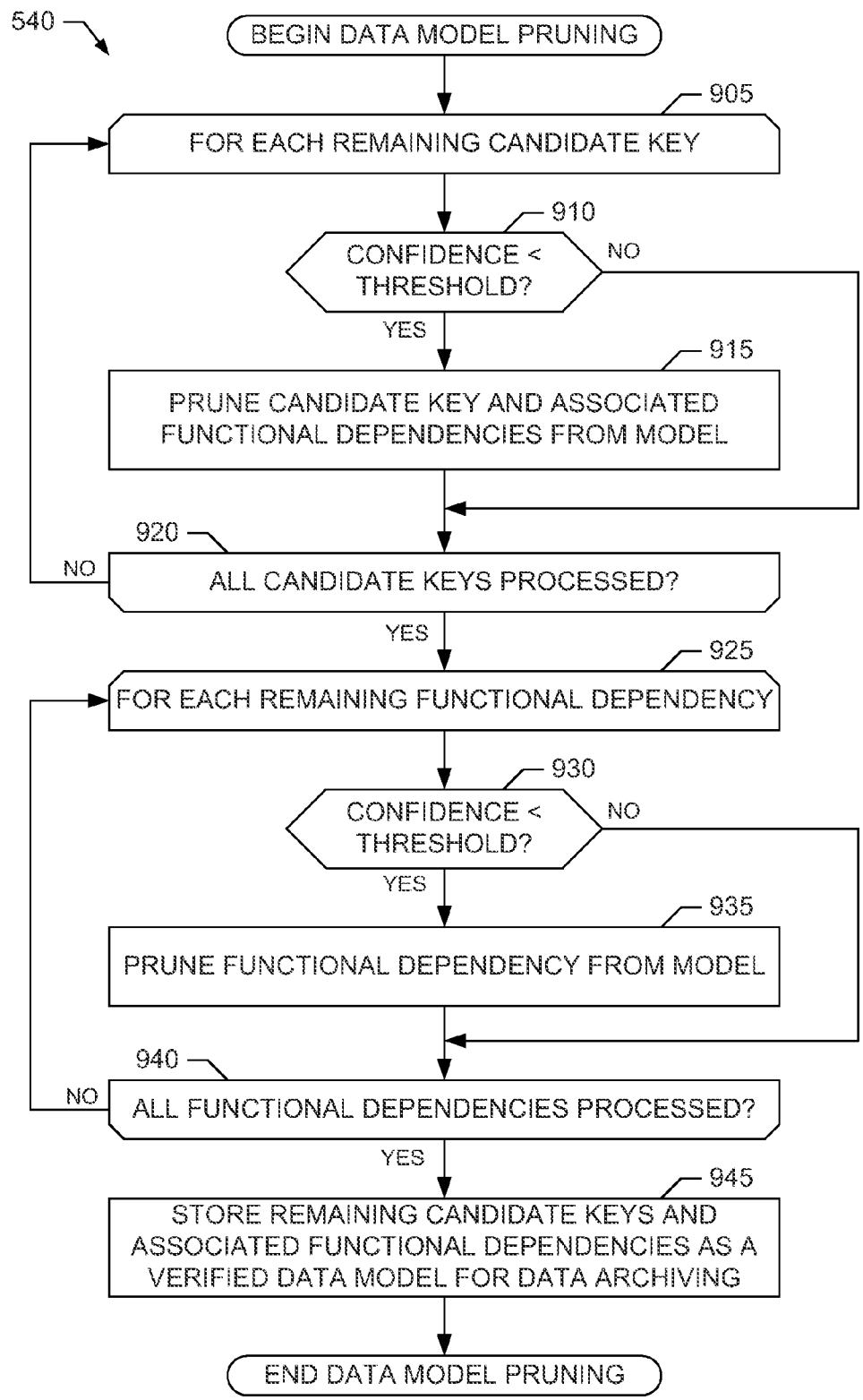
FIG. 9 is a flowchart representative of example machine readable instructions that may be executed to implement data model pruning in the data modeler of FIG. 4 and/or the data archiver of FIG. 1.

If another data modeling processing iteration is to be performed (block 535), the processing returns to block 510A and blocks subsequent thereto. However, if another data modeling processing iteration is not to be performed (block 535), then at block 540 the data modeler 120 performs data model pruning to determine a resulting verified data model. For example, at block 540 the data modeler 120 can determine the verified data model by pruning candidate keys (and associated functional dependencies) having confidence values lower than a threshold, and can also prune individual functional dependencies having confidence values lower than the same or a different threshold. The data modeler 120 then stores the verified data model to the data model storage 125. An example procedure that may be used to implement the processing at block 540 is illustrated in FIG. 9 and described in greater detail below.

After the verified data model is determined by the data modeler 120, at block 545 the transaction archiver 130 included in the data archiver 105 uses the verified data model stored in the data model storage 125 to archive data (e.g., transactions) from the production database 110 to the archive 115 according to the verified data model, as described above. Execution of the example machine readable instructions 500 then ends.

Example machine readable instructions 510A-C that may be executed to implement the processing at blocks 510A, 510B and 510C of FIG. 5 are represented by the flowchart shown in FIG. 6. With reference to the data archiver 105 illustrated in FIG. 1 and the data modeler 120 illustrated in FIG. 4, the machine readable instructions 510A-C of FIG. 6 begin execution at block 605 at which the data modeler 120 determines whether an input command received via the user interface 410 is for data model initialization. If so, at block 610 the data modeler 120 processes the user input, which in the illustrated example is a user command indicated that one or more data attributes (e.g., columns) are to be excluded (e.g., masked out) from consideration as candidate keys in the verified data model. For example, at block 610 the data modeler 120 may cause an initial data model to be presented (e.g., in tabular form, graphical form, etc.), via the user interface 410, to a user of the terminal 135. Because the initial data model determined by the data modeler 120 assumes fully interdependent functional dependencies, in the initial data model each attribute (column) or set of attributes (columns) are assumed to be candidate keys. Through processing at block 610, the user can exclude (mask-out) attributes that would not uniquely identify data transactions and, thus, do not qualify as keys. For example, in a customer sales database, the attribute 'purchase quantity' may not qualify as a key because different customers can purchase the same quantity of an item. Accordingly, at block 610 the user can exclude such an attribute from being a candidate key in the data model during initialization (e.g., to improve processing efficiency).

Assuming no input commands are received for candidate key verification or functional dependency verification, then at block 615 of the illustrated example the data modeler 120 processes another input from the user indicating whether to continue or terminate the data modeling processing currently being performed. If, for example, data model initialization has just completed, the user can issue a command to terminate data modeling, thereby causing the initial data model (after any candidate key exclusion) to become the verified data model. Execution of the example machine readable instructions 510A-C then ends. As indicated in FIG. 6, the processing at blocks 605, 610 and 615 corresponds to the processing performed at block 510A of FIG. 5.

At block 620, the data modeler 120 determines whether an input command received via the user interface 410 is for candidate key verification. If so, then at block 625 the data modeler 120 obtains any user input commands to prune one or more candidate keys from the set of candidate keys. For example, the data modeler 120 can cause the parent attribute set forming each candidate key to be presented (e.g., in tabular form, graphical form, etc.), via the user interface 410, to a user of the terminal 135. The data modeler 120 can cause the confidence level associated with each candidate key to also be presented. The data modeler 120 can then prompt the user to select one or more candidate keys to be pruned (e.g., removed) from the set of candidate keys and, thus, from the data model. Pruning of a candidate key also causes any functional dependencies associated with the candidate key to be removed from the data model.

At block 630, the data modeler 120 obtains any user input commands to force inclusion of one or more candidate keys in the data model. For example, after presenting the set of candidate keys and their respective confidence levels, the data modeler 120 can then prompt the user to select one or more candidate keys to be included in the data model without requiring any further verification. In some examples, forcing inclusion of a candidate key in the data model also causes its associated confidence level to be set to a specific (e.g., maximum) value, such as 100%.

Assuming no input commands are received for functional dependency verification, then at block 615 of the illustrated example the data modeler 120 processes another input from the user indicating whether to continue or terminate the data modeling processing currently being performed. If, for example, the current iteration of candidate key verification has just completed, the user can issue a command to terminate data modeling, thereby causing the current data model having the current set of candidate keys (and associated functional dependencies) to become the verified data model. Execution of the example machine readable instructions 510A-C then ends. Example reasons for a user to terminate the data modeling process include, but are not limited to, the user being satisfied with the currently determined (e.g., currently verified) data model, an allotted time window having expired, the user plans to resume processing at a later time, etc. As indicated in FIG. 6, the processing at blocks 620, 625, 630 and 615 corresponds to the processing performed at block 510B of FIG. 5.

At block 635, the data modeler 120 determines whether an input command received via the user interface 410 is for functional dependency verification. If so, then at block 640 the data modeler 120 obtains any user input commands to prune one or more functional dependencies from the data model. For example, the data modeler 120 can cause the parent attribute set for each candidate key (or some selected subset) to be presented (e.g., in tabular form, graphical form, etc.) along with the dependent attribute set(s) functionally depending from the candidate key to a user of the terminal 135 via the user interface 410. The data modeler 120 can cause the confidence level associated with each functional dependency to also be presented. The data modeler 120 can then prompt the user to select one or more functional dependencies to be pruned (e.g., removed) from the set of functional dependencies associated with a particular candidate and, thus, from the data model. In some examples, pruning of all functional dependencies associated with a particular candidate key also causes the candidate key itself to be removed from the data model.

At block 645, the data modeler 120 obtains any user input commands to force inclusion of one or more functional dependencies in the data model. For example, after presenting a candidate key, its associated functional dependencies (e.g., the associated dependent attribute sets) and their respective confidence levels, the data modeler 120 can then prompt the user to select one or more functional dependencies to be included in the data model without requiring any further verification. In some examples, forcing inclusion of a functional dependency in the data model also causes its associated confidence level to be set to a specific (e.g., maximum) value, such as 100%.

Then, at block 615 of the illustrated example, the data modeler 120 processes another input from the user indicating whether to continue or terminate the data modeling processing currently being performed. If, for example, the current iteration of functional dependency verification has just completed, the user can issue a command to terminate data modeling, thereby causing the current data model having the current set of candidate keys and associated functional dependencies to become the verified data model. Execution of the example machine readable instructions 510A-C then ends. As noted above, example reasons for user to terminate the data modeling process include, but are not limited to, the user being satisfied with the currently determined (e.g., currently verified) data model, an allotted time window having expired, the user plans to resume processing at a later time, etc. As indicated in FIG. 6, the processing at blocks 635, 640, 645 and 615 corresponds to the processing performed at block 510B of FIG. 5.

At block 615, the data modeler 120 can also process an input command from the user received via the user interface 410 indicating whether to continue or terminate data modeling processing altogether (e.g., without receiving any other input commands related to data model initialization, candidate key verification or functional dependency verification). For example, the data modeler 120 can be interrupted to cause the current data model, along with the confidence levels of the candidate keys and associated functional dependencies, to be presented (e.g., in tabular form, graphical form, etc.) to the user of the terminal 135 via the user interface 410. The data modeler 120 can then prompt the user to indicate whether data modeling processing should continue (e.g., if one or more confidence levels have not converged or have not reached one or more particular thresholds) or can be terminated. Execution of the example machine readable instructions 510A-C then ends.

Example machine readable instructions 515 that may be executed to implement the processing at block 515 of FIG. 5 are represented by the flowchart shown in FIG. 7. With reference to the data archiver 105 illustrated in FIG. 1 and the data modeler 120 illustrated in FIG. 4, the machine readable instructions 515 of FIG. 7 begin execution at block 705 at which the candidate key selector 415 included in the data modeler 120 determines a set of non-trivial candidate keys for the data model. As noted above, a candidate key can correspond to a particular parent attribute or parent attribute set. In the case of a candidate key corresponding to a parent attribute set, the candidate key is non-trivial if the parent attribute set does not include a particular attribute or subset of attributes that is also a candidate key. For example, with reference to FIG. 2, at block 705 the candidate key selector 415 could include the attribute 'C' of column 225, the attribute 'C' of column 255 and the attribute 'Q' of column 260 in the set of non-trivial candidate keys. In some examples, for a first iteration of the machine readable instructions 515 of FIG. 7, the set of candidate keys correspond to the set of candidate keys of the initial data model that assumes fully interdependent functional dependencies. Accordingly, the set of candidate keys for this first iteration include a key for each attribute (columns) in each data set (table), except for those that are expressly excluded by the user from the initial model. Then, for each subsequent iteration, the set of candidate keys includes those keys remaining after pruning, as well as parent attributes or parent attribute sets forced to be keys based on one or more user inputs.

Next, at block 710 the candidate key selector 415 assigns a first confidence level (e.g., such as 0% or some other minimum value) to each candidate key that was determined automatically or, in other words, was not specified by a user. Conversely, for each candidate key that is specified by a user via the terminal 135 and user interface 410, at block 715 the candidate key selector 415 assigns a second confidence level (e.g., such as 100% or some other maximum value) to that candidate key. The first confidence level and/or the second confidence level can be specified as configuration parameters, hard-coded, etc.

Next, at block 720 the candidate key verifier 420 included in the data modeler 120 generates a sample of the data stored in the production database 110 for use in verifying the set of candidate keys. Modern databases can include millions of data entries. Accordingly, verifying each candidate key over the entire database can be computationally prohibitive. Instead, the candidate key verifier 420 generates a data sample containing a subset of the data stored in the production database. For example, the data sample can contain N groups of samples each containing M data entries, where N and M are configuration parameters specified by the user via the terminal 135 and user interface 410. The N groups may be taken from the same data set (e.g., same database table) or taken from two up to N different data sets (e.g., different tables) included in the database. The same or different numbers M of data entries can be sampled from each data set. Additionally or alternatively, all the data entries included in one or more data set (e.g., tables) may be specified for inclusion in the data sample. In some examples, the candidate key verifier 420 maintains the association of a data sample to the particular data sets (e.g., tables) from which the data sample was taken. For example, with reference to FIG. 2, the candidate key verifier 420 could generate a data sample including N=2 groups, with M≤2 data entries taken from table 205 and M≤5 data entries taken from table 210.

After generating the data sample, the candidate key verifier 420 verifies each candidate key against the data sample (blocks 725 and 730). For example, for a particular candidate key, the candidate key verifier 420 can determine whether the data sample indicates that data set (e.g., table) associated with the parent attribute set for the particular candidate key has unique entry values and, thus, may be specifying the unique, permissible values for this attribute in data transactions stored in the production database 110 (block 735). For example, with reference to FIG. 2, the attribute 'C' of column 225 has unique values across all data entries in its respective table 205 and, thus, could be a parent attribute specifying the permissible, unique values for this attribute, which can be used to uniquely identify different data transactions stored in the production database 110. Accordingly, the attribute 'C' of column 225 could be a candidate key. Conversely, the attribute 'C' of column 255 and the attribute 'Q' of column 260 do not have unique values across all data entries in their respective table 210 and, thus, these attributes do not qualify as candidate keys. For processing efficiency, the candidate key verifier 420 can skip verification of candidate keys forced by the user for inclusion in the data model. Additionally or alternatively, the candidate key verifier 420 can skip verification of candidate keys whose associated confidence levels have reached a maximum value (e.g., such as 100%).

If a particular candidate key has unique values for its respective data entries included in the data sample (block 735), then at block 740 the candidate key verifier 420 increases the confidence level of the particular candidate key (e.g., by some specified incremental amount). In the illustrated example, the candidate key verifier 420 increments the confidence level at block 740 rather than just indicating that the particular candidate key has been verified because the data sample may contain only a subset of all data. As such, another data sample could indicate that the particular candidate key is actually not a key if, for example, that data sample included the same values for the particular candidate key in at least two data entries.

If, however, the particular candidate key does not have unique values for its respective data entries included in the data sample (block 735), then at block 745 the candidate key verifier 420 prunes the particular candidate key from the set of candidate keys. Then, after all candidate keys have been processed (block 750), the user input processing associated with block 510B of FIGS. 5-6 is performed. If an obtained user input indicates that another iteration of candidate key verification is to be performed (block 755) processing returns to block 720 at which another (e.g., different) data sample is generated for verifying the set of remaining candidate keys. For example, the user may determine that another iteration is warranted when the confidence levels for all candidate keys have not yet converged to steady-state values. However, if the user input indicates that another iteration of candidate key verification is not to be performed (block 755), execution of the example machine readable instructions 515 then ends.

Example machine readable instructions 525 that may be executed to implement the processing at block 525 of FIG. 5 are represented by the flowchart shown in FIG. 8. With reference to the data archiver 105 illustrated in FIG. 1 and the data modeler 120 illustrated in FIG. 4, the machine readable instructions 525 of FIG. 8 begin execution at block 805 at which the functional dependency selector 425 included in the data modeler 120 determines a set of atomic functional dependencies for each candidate key in the set of candidate keys in the data model. As noted above, a functional dependency for a particular candidate key corresponds to a dependent attribute set that functional depends from a parent attribute set forming the candidate key. A dependent attribute set yields an atomic functional dependency if there is no complete combination of subsets of the dependent attribute set that are each by themselves functionally dependent on the particular candidate key. For example, with reference to FIG. 2, the attribute 'C' of column 225 is a candidate key, and attribute 'C' of column 255 functionally depends on this candidate key because, in this example, the attributes have the same name and attribute 'C' of column 255 takes on the values specified by attribute 'C' of column 225. In contrast, attribute 'Q' of column 260 takes on values different from the values of the candidate key (e.g., attribute 'C' of column 225) and, thus, does not itself functionally depend on the candidate key. Accordingly, the dependent attribute set made up of attribute 'C' of column 255 and attribute 'Q' of column 260 would form an atomic functional dependency of the candidate key (e.g., attribute 'C' of column 225).

In some examples, for a first iteration of the machine readable instructions 525 of FIG. 8, the set of functional dependencies corresponds to the initial data model that assumes fully interdependent functional dependencies. Accordingly, for this first iteration, the set of functional dependencies for a particular candidate key include a functional dependency for each attribute (columns) in each data set (table), except for the attribute forming the candidate key itself and those that are excluded by the user from the initial model (e.g., by excluding the candidate key itself). Then, for each subsequent iteration, the set of functional dependencies for a particular candidate key includes those dependent attributes not pruned by the user, as well as dependent attributes or dependent attribute sets forced to be included as functional dependencies based on one or more user inputs.

Next, at block 810 the functional dependency selector 425 assigns a first confidence level (e.g., such as 0% or some other minimum value) to each functional dependency that was determined automatically or, in other words, was not specified by a user. Conversely, for each functional dependency that is specified by a user via the terminal 135 and user interface 410, at block 815 the functional dependency selector 425 assigns a second confidence level (e.g., such as 100% or some other maximum value) to that functional dependency. The first confidence level and/or the second confidence level can be specified as configuration parameters, hard-coded, etc.

Next, at block 820 the functional dependency verifier 430 included in the data modeler 120 generates a sample of the data stored in the production database 110 for use in verifying the set of functional dependencies. For example, the procedure for generating data samples at block 820 may the same or similar to the procedure of generating samples at block 720 of FIG. 7.

After generating the data sample, the functional dependency verifier 430 verifies each functional dependency for each candidate key against the data sample (blocks 825 and 830). In the illustrated example, for a particular functional dependency of a particular candidate key, the functional dependency verifier 430 determines whether the data sample tends to confirm that the dependent attribute set does functionally depend from the parent attribute set for the particular candidate key (block 835). For example, the data sample tends to confirm that the dependent attribute set does functionally depend from the parent attribute set for the particular candidate key when the values of a dependent attribute that supposedly depends from a parent attribute does not take on values that are different from the parent attribute. For example, with reference to FIG. 2, the attribute 'C' of column 255 takes on the same values as the attribute 'C' of column 225 and, thus, a data sample drawn from data entries of table 205 and table 210 would tend to confirm that attribute 'C' of column 255 functionally depends on attribute 'C' of column 225. Conversely, the attribute 'Q' of column 260 takes on different values than the attribute 'C' of column 225 and, thus, a data sample drawn from data entries of table 205 and table 210 would tend to confirm that attribute 'Q' of column 260 does not functionally depend on attribute 'C' of column 225. For processing efficiency, the functional dependency verifier 430 can skip verification of functional dependencies forced by the user for inclusion in the data model. Additionally or alternatively, the functional dependency verifier 430 can skip verification of functional dependencies whose associated confidence levels have reached a maximum value (e.g., such as 100%).

If a particular functional dependency is confirmed by the data sample (block 735), then at block 840 the functional dependency verifier 430 increases the confidence level of the particular functional dependency (e.g., by some specified incremental amount). In the illustrated example, the functional dependency verifier 430 increments the confidence level at block 840 rather than just indicating that the particular functional dependency has been verified because the data sample may contain only a subset of all data. As such, another data sample could indicate that the particular functional dependency is actually not a dependency of the associated candidate key if, for example, that data sample included different values for associated dependent and parent attributes making up the functional dependency.

If, however, the particular functional dependency is not confirmed by the data sample (block 835), then at block 845 the functional dependency verifier 430 decreases the confidence level of the particular functional dependency (e.g., by some specified decremental amount). In the illustrated example, the functional dependency verifier 430 decrements the confidence level at block 845 rather than just pruning the particular functional dependency because the data sample may contain only a subset of all data. As such, another data sample could indicate that the particular functional dependency is a dependency of the associated candidate key if, for example, that data sample included the same values for associated dependent and parent attributes making up the functional dependency.

Then, after all functional dependencies of all candidate keys have been processed (block 850), the user input processing associated with block 510C of FIGS. 5-6 is performed. If an obtained user input indicates that another iteration of functional dependency verification is to be performed (block 855) processing returns to block 820 at which another (e.g., different) data sample is generated for verifying the set of remaining functional dependencies for each remaining candidate key. For example, the user may determine that another iteration is warranted when the confidence levels for all functional dependencies have not yet converged to steady-state values. However, if the user input indicates that another iteration of functional dependency verification is not to be performed (block 855), execution of the example machine readable instructions 525 then ends.

Example machine readable instructions 540 that may be executed to implement the processing at block 540 of FIG. 5 are represented by the flowchart shown in FIG. 9. With reference to the data archiver 105 illustrated in FIG. 1 and the data modeler 120 illustrated in FIG. 4, the machine readable instructions 540 of FIG. 9 begin execution at block 905 at which, for each candidate key remaining in the set of candidate keys (e.g., such as hose candidate keys that have not been pruned automatically or forced to be pruned by the user), the data model processor 435 included in the data modeler 120 determines whether to prune the particular candidate key from the data model. In particular, at block 910 the data model processor 435 determines whether the confidence level for a particular remaining candidate key is below a first threshold (which may be specified via configuration information, hard-coded, etc.). If the confidence level is below the first threshold (block 910), then at block 915 the data model processor 435 prunes the particular candidate key and its associated functional dependencies from the data model.

For example, with reference to FIG. 2, assume that attribute 'Q' of column 260 is a remaining candidate key with two functional dependencies, one corresponding to attribute 'C' of column 255 being a dependent attribute and the other corresponding to attribute 'C' of column 225 being another dependent attribute. If, after the processing of FIGS. 5-8, the confidence level associated with the attribute 'Q' of column 260 being a candidate key is below the first threshold, then the candidate key corresponding to attribute 'Q' of column 260 would be pruned at block 915, as well as its associated functional dependencies corresponding to attribute 'C' of column 255 being a dependent attribute and attribute 'C' of column 225 being another dependent attribute.

At block 920, the data model processor 435 continues processing all remaining candidate keys. Of course, for processing efficiency, the processing at blocks 905-920 can be skipped for any candidate keys forced by the user to be included in the data model.

Continuing to block 925, for each functional dependency remaining for each remaining candidate key (e.g., such as those functional dependencies that have not been forced to be pruned by the user), the data model processor 435 included in the data modeler 120 determines whether to prune the particular functional dependency from the data model. In particular, at block 930 the data model processor 435 determines whether the confidence level for a particular remaining functional dependency for a particular remaining candidate key is below a second threshold (which may be specified via configuration information, hard-coded, etc., and which may be the same as, or different from, the first threshold used at block 910). If the confidence level is below the second threshold (block 930), then at block 935 the data model processor 435 prunes the particular functional dependency from the data model.

For example, with reference to FIG. 2, assume that attribute 'C' of column 225 is a remaining candidate key with two functional dependencies, one corresponding to attribute 'C' of column 255 being a dependent attribute and the other corresponding to attribute 'Q' of column 260 being another dependent attribute. If, after the processing of FIGS. 5-8, the confidence level associated with the attribute 'Q' of column 260 being a functional dependency of the candidate key (e.g., attribute 'C' of column 225) is below the second threshold, then the functional dependency corresponding to attribute 'Q' of column 260 would be pruned at block 935, leaving to attribute 'C' of column 255 as a remaining functional dependency for the candidate key (e.g., attribute 'C' of column 225).

At block 940, the data model processor 435 continues processing all remaining functional dependencies for all remaining candidate keys. Of course, for processing efficiency, the processing at blocks 925-940 can be skipped for any functional dependencies forced by the user to be included in the data model.

Next, at block 945 the data model processor 435 stores the remaining candidate keys and associated functional dependencies in the data model storage 125 as the verified data model for use by the transaction archiver 130 for data archiving. Execution of the example machine readable instructions 540 then ends.

Figure 10:
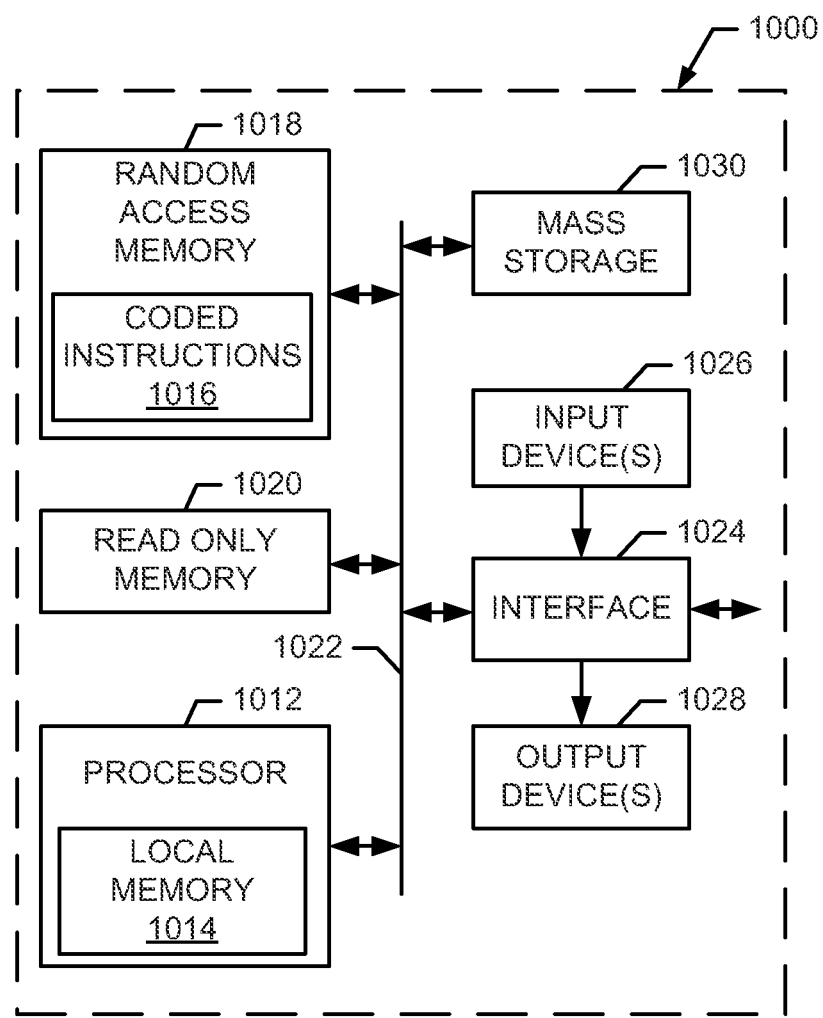
FIG. 10 is a block diagram of an example processing system that may execute the example machine readable instructions of FIGS. 5-9 to implement the data archiver of FIG. 1 and/or the data modeler of FIG. 4.

FIG. 10 is a block diagram of an example processing system 1000 capable of implementing the apparatus and methods disclosed herein. The processing system 1000 can be, for example, a server, a personal computer, a personal digital assistant (PDA), an Internet appliance, a DVD player, a CD player, a digital video recorder, a personal video recorder, a set top box, or any other type of computing device.

The system 1000 of the instant example includes a processor 1012 such as a general purpose programmable processor. The processor 1012 includes a local memory 1014, and executes coded instructions 1016 present in the local memory 1014 and/or in another memory device. The processor 1012 may execute, among other things, the machine readable instructions represented in FIGS. 5-9 The processor 1012 may be any type of processing unit, such as one or more Intel® microprocessors from the Pentium® family, the Itanium® family and/or the XScale® family, one or more microcontrollers from the ARM® and/or PICO families of microcontrollers, etc. Of course, other processors from other families are also appropriate.

The processor 1012 is in communication with a main memory including a volatile memory 1018 and a non-volatile memory 1020 via a bus 1022. The volatile memory 1018 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller (not shown).

The processing system 1000 also includes an interface circuit 1024. The interface circuit 1024 may be implemented by any type of interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, an isopoint and/or a voice recognition system.

One or more output devices 1028 are also connected to the interface circuit 1024. The output devices 1028 can be implemented, for example, by display devices (e.g., a liquid crystal display, a cathode ray tube display (CRT)), by a printer and/or by speakers. The interface circuit 1024, thus, typically includes a graphics driver card.

The interface circuit 1024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1000 also includes one or more mass storage devices 1030 for storing software and data. Examples of such mass storage devices 1030 include floppy disk drives, hard drive disks, compact disk drives and digital versatile disk (DVD) drives. The mass storage device 1030 may implement the production database 110 and/or the archive 115. Alternatively, the volatile memory 1018 may implement the production database 110 and/or the archive 115.

As an alternative to implementing the methods and/or apparatus described herein in a system such as the processing system of FIG. 10, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to archive data, the method comprising:
electronically determining an initial data model representing functional dependencies among attributes of the data, the initial data model having fully interdependent functional dependencies among the attributes of the data;
processing the initial data model in a processor-based machine to electronically prune one or more functional dependencies from the initial data model to determine a verified data model, wherein a given functional dependency indicates that a dependent attribute set depends from a key comprising a parent attribute set and processing the initial data model comprises:
determining a set of candidate keys comprising respective parent attribute sets;
generating a sample of the data;
pruning a particular candidate key from the set of candidate keys when the sample indicates that the particular parent attribute set corresponding to the particular candidate key does not have unique entries; and
archiving a transaction included in the data to memory according to the verified data model.

2. A method as defined in claim 1 wherein the data comprises a plurality of data sets each having one or more respective attributes, a functional dependency indicates that a first attribute of a first data set depends upon a second attribute of the first data set or a second data set, and the transaction comprises a plurality of data entries each having a same value for the first attribute, the same value corresponding to a unique value of the second attribute.

3. A method as defined in claim 1 further comprising increasing a confidence value associated with the particular candidate key when the sample indicates that the particular parent attribute set corresponding to the particular candidate key does have unique entries.

4. A method as defined in claim 1 further comprising:
  initially assigning a first confidence value to each candidate key specified by a user; and
  initially assigning a second confidence value to each candidate key specified automatically.

5. A method as defined in claim 1 wherein a functional dependency indicates that a dependent attribute set depends from a key comprising a parent attribute set, and further comprising:
  determining a set of functional dependencies for a set of candidate keys, the set of functional dependencies comprising respective dependent attribute sets;
  generating a sample of the data; and
  increasing a confidence value associated with a particular functional dependency from the set of functional dependencies when the sample indicates that the particular dependent attribute set corresponding to the particular functional dependency does depend upon an associated candidate key.

6. A method as defined in claim 5 further comprising decreasing the confidence value associated with the particular functional dependency when the sample indicates that the particular dependent attribute set corresponding to the particular functional dependency does not depend upon an associated candidate key.

7. A method as defined in claim 5 further comprising:
  initially assigning a first confidence value to each functional dependency specified by a user; and
  initially assigning a second confidence value to each functional dependency specified automatically.

8. A method as defined in claim 1 wherein a functional dependency indicates that a dependent attribute set depends from a key comprising a parent attribute set, and further comprising:
  determining a set of candidate keys comprising respective parent attribute sets;
  determining a set of functional dependencies for the set of candidate keys, the set of functional dependencies comprising respective dependent attribute sets;
  when a first confidence value associated with a first candidate key is less than a first threshold, pruning the first candidate key from the set of candidate keys and pruning a first subset of functional dependencies associated with the first candidate key from the set of functional dependencies to determine the verified data model; and
  when a first confidence value associated with a first functional dependency is less than a second threshold, pruning the first functional dependency from the set of functional dependencies to determine the verified data model.

9. A tangible article of manufacture comprising a non-transitory computer readable storage medium to store machine readable instructions which, when executed, cause a processor-based machine to:
  determine an initial data model representing functional dependencies among attributes of data to be archived, the initial data model having fully interdependent functional dependencies among the attributes of the data, wherein a given functional dependency indicates that a determined attribute set depends from a key comprising a parent attribute set;
  prune one or more functional dependencies from the initial data model to determine a verified data model;
  archive a transaction included in the data to memory according to the verified data model;
  determine a set of candidate keys comprising respective parent attribute sets;
  initially assign a first confidence value to each candidate key specified by a user;
  initially assign a second confidence value to each candidate key specified automatically;
  generate a sample of the data;
  prune a particular candidate key from the set of candidate keys when the sample indicates that the particular parent attribute set corresponding to the particular candidate key does not have unique entries.

10. A tangible article of manufacture as defined in claim 9, wherein the machine readable instructions, when executed, further cause the machine to:
  increase the confidence value associated with the particular candidate key when the sample indicates that the particular parent attribute set corresponding to the particular candidate key does have unique entries.

11. A tangible article of manufacture as defined in claim 9, wherein the machine readable instructions, when executed, further cause the machine to:
  determine a set of functional dependencies for the set of candidate keys, the set of functional dependencies comprising respective dependent attribute sets;
  initially assign a first confidence value to each functional dependency specified by a user;
  initially assign a second confidence value to each functional dependency specified automatically;
  increase a confidence value associated with a particular functional dependency from the set of functional dependencies when the sample indicates that the particular dependent attribute set corresponding to the particular functional dependency does depend upon an associated candidate key; and
  decrease the confidence value associated with the particular functional dependency when the sample indicates that the particular dependent attribute set corresponding to the particular functional dependency does not depend upon an associated candidate key.

12. An apparatus to archive data, the apparatus comprising:
  a data modeler comprising a processor to determine a data model for data stored in a database comprising a plurality of tables each having one or more columns corresponding to a respective one or more attributes and one or more rows corresponding to a respective one or more data entries, the data model initialized to have all columns in all tables being all-to-all functionally dependent on each other, the data modeler to remove from the model a functional dependency representing that a dependent column set depends from a candidate key comprising a parent column set when at least one of (1) a first confidence value representing a confidence that the candidate key is an actual key capable of uniquely identifying data transactions is less than a first threshold, or (2) a second confidence value representing a confidence that the dependent columns set actually depends from the candidate key is less than a second threshold, wherein the data model comprises a plurality of candidate keys and a plurality of functional dependencies representing a plurality of dependent column sets depending from the plurality of candidate keys and each candidate key comprising a respective parent column set, wherein the data modeler comprises:
    a candidate key verifier to iteratively compare each respective candidate key to a first plurality of samples of the data to update a respective confidence value associated with the respective candidate key; and
    a functional dependency verifier to iteratively compare each respective functional dependency for each respective candidate key to a second plurality of samples of the data to update a respective confidence value associated with the respective functional dependency; and a storage element to store the data model, the data to be archived based on the data model.

13. An apparatus as defined in claim 12 wherein the data modeler further comprises a user interface to accept one or more of a set of commands from a user, the set of commands comprising:

a first command to force removal of a specified candidate key from the data model;

a second command to force inclusion of the specified candidate key in the data model and to cause a confidence value associated with the specified candidate key to be set to a maximum value;

a third command to force removal of a specified functional dependency from the data model; and a fourth command to force inclusion of the specified functional dependency in the data model and to cause a confidence value associated with the specified functional dependency to be set to the maximum value.

* * * * *